(12) United States Patent
Rieuvernet

(10) Patent No.: US 11,747,491 B2
(45) Date of Patent: Sep. 5, 2023

(54) RADIOLOGICAL DETECTOR STRUCTURE COMPRISING A MECHANICAL PROTECTION HOUSING HAVING PLURAL LAYERS OF RIGID MATERIAL WITH A LAYER OF CELLULAR MATERIAL THEREBETWEEN

(71) Applicant: TRIXELL, Moirans (FR)

(72) Inventor: Pierre Rieuvernet, Moirans (FR)

(73) Assignee: TRIXELL, Moirans (FR)

( * ) Notice: Subject to any disclaimer, the term of this patent is extended or adjusted under 35 U.S.C. 154(b) by 192 days.

(21) Appl. No.: 17/518,502

(22) Filed: Nov. 3, 2021

(65) Prior Publication Data

US 2022/0146696 A1 May 12, 2022

(30) Foreign Application Priority Data

Nov. 9, 2020 (FR) ...................................... 2011467

(51) Int. Cl.
*G01T 1/20* (2006.01)

(52) U.S. Cl.
CPC ...... *G01T 1/20181* (2020.05); *G01T 1/20184* (2020.05); *G01T 1/20189* (2020.05)

(58) Field of Classification Search
CPC .... G01T 1/20; G01T 1/17; G01T 1/16; A61B 6/42; G03B 42/02

USPC ................................ 250/239, 208.1, 214 VT
See application file for complete search history.

(56) References Cited

U.S. PATENT DOCUMENTS 9,380,988 B2 * 7/2016 Kitano ..................... A61B 6/56
2006/0038132 A1 2/2006 Hayashida
2008/0078939 A1 4/2008 Hennessy et al.

FOREIGN PATENT DOCUMENTS

| EP | 0 174 671 A1 | 3/1986 |
|---|---|---|
| JP | 2014-81364 A | 5/2014 |

* cited by examiner

*Primary Examiner* — Que Tan Le
(74) *Attorney, Agent, or Firm* — BakerHostetler

(57) ABSTRACT

A portable radiological cassette includes a scintillator, a photosensitive slab, the scintillator and the photosensitive slab forming a panel, the panel having a front face intended to receive the incident x-ray and a rear face opposite the front face, an electronic circuit board, a mechanical protection housing, wherein the panel and the electronic circuit board are disposed, comprising a top face and a bottom face; wherein the top face of the mechanical protection housing comprises: a first layer of rigid material, a second layer of rigid material, the second layer of rigid material being in contact with the front face of the panel, a layer of cellular material disposed between the first and the second layers of rigid material.

11 Claims, 2 Drawing Sheets

RADIOLOGICAL DETECTOR STRUCTURE COMPRISING A MECHANICAL PROTECTION HOUSING HAVING PLURAL LAYERS OF RIGID MATERIAL WITH A LAYER OF CELLULAR MATERIAL THEREBETWEEN

CROSS-REFERENCE TO RELATED APPLICATIONS

This application claims priority to foreign French patent application No. FR 2011467, filed on Nov. 9, 2020, the disclosure of which is incorporated by reference in its entirety.

FIELD OF THE INVENTION

The invention sits within the field of imaging. It can be applied to any type of imager, notably x-ray, visible and infrared imagers. The invention is explained here within the field of x-ray medical imaging, by way of example and without any loss of applicability to other imaging fields. The invention relates to a portable radiological cassette and in particular an innovative radiological cassette structure enhancing the protection of the cassette against drops, impacts from outside objects, localized or distributed pressure forces and any stresses.

BACKGROUND

In the past, the radiological systems were bulky and largely unmovable. It was necessary to position the object with respect to the system to obtain the desired image. With the emergence of solid-state detectors, the detector became less bulky and it was possible to move the detector with respect to an object that remained fixed. For medical radiology, digital detectors were produced in the form of mobile cassettes that could now be placed in immediate proximity to a patient from whom an image was required, when the state of health of the patient prevented him or her moving to a room reserved for radiology.

The digital radiological cassettes essentially consist of at least one scintillator, whose role is to emit a visible light under the action of x-rays, a matrix of photodiodes produced on a substrate usually made of glass, called "slab" hereinafter in the document, which converts the light signal emitted by the scintillator into electrical charges, and one or more electronic circuit boards which read these charges and convert them into a visible digital image.

The need for flexibility and reactivity in the use of this type of equipment led the manufacturers to propose digital radiological cassettes in a portable format. These portable cassettes then have to reconcile extreme resistance to external aggression with reduced weight and size. In fact, these portable cassettes can be exposed in their handling, and throughout their life, to drops, impacts from external objects, localized or distributed pressure loads, and bending stresses when the weight of a patient is exerted on a detector which is not uniformly supported. For that, the mechanical structure of the detectors needs to ensure maximum protection of the fragile elements that are the scintillator, the slab and the electronic circuit board.

In the traditional design of the portable radiological cassettes, the scintillator is associated with a slab to form a subassembly called panel. This panel is held against a base which provides it with rigidity and mechanical support. Finally, this panel is equipped with one or more electronic circuit boards before being inserted into a housing. To limit the total weight of the portable cassette and ensure a low absorption of the x-rays passing through it, the thickness of this housing, and particularly the thickness of the front face of the housing facing the x-ray source, is generally limited.

FIG. 1 represents a cross-sectional view of a portable radiological cassette structure known from the prior art. Conventionally, a portable radiological cassette 1 comprises:
  a scintillator 2 capable of converting an incident x-ray into a light signal,
  a photosensitive slab 3 capable of converting the light signal emitted by the scintillator 2, after conversion of the x-ray, into an electrical charge. The scintillator 2 and the photosensitive slab 3 then form a panel 4. The panel 4 comprises a front face 41 intended to receive the incident x-ray according to a direction of incidence Z of the x-rays, a rear face 42 opposite the front face 41 and two lateral edges 43 (in the cross-sectional view),
  an electronic circuit board 5 which ensures the conversion of the electrical charge into a digital image,
  a mechanical protection housing 6, in which the panel 4 and the electronic circuit board 5 are disposed, which comprises a top face 61 against which the incident x-ray is projected, a bottom 62 opposite the top face 61 and two lateral faces 63 (in the cross-sectional view).

The portable radiological cassette 1 also comprises two fixing supports 7 positioned inside the housing 6, each fixing support 7 being placed against a lateral face 63 of the housing. The two fixing supports 7 form a kind of base for the panel 4.

The panel is held at its lateral edges 43 against the lateral faces 63 of the housing 6 using the fixing supports 7. There is therefore at least one cavity 64 inside the housing 6 which defines an empty space between the front face 41 of the panel 4 and the top face 61 of the housing 6. There can also, optionally, be a second empty space between the rear face 42 of the panel 4 and the bottom 62 of the housing 6 partially filled by the electronic circuit board 5.

A flexible foam 8 is then inserted into the cavity 64 in order to completely fill it and to be in physical contact with the front face 41 of the panel 4 on one side and with the top face 61 of the housing 6 on another side. The ISO 4090 standard is restrictive with respect to the dimensions of the portable cassette, so the flexible foam 8 has to be extremely malleable. This flexible foam 8 provides insulation against impacts in the direction of incidence Z of the x-rays.

Thus, the base formed by the fixing supports 7 provides the rigidity and avoids excessive deformation of the panel 4 should the portable cassette be dropped or in the case of bending, and the flexible foam 8 of the housing 6 makes it possible to protect the panel 4 from the impacts. Finally, the combined rigidity of the housing 6 (accompanied by the flexible foam 8) and of the base avoid any great degradation in cases of pressure on the cassette.

Nevertheless, thickness constraints on the housing, and notably observance of the ISO 4090 standard which limits this dimension to 15 millimetres, prevent providing each of these parts, namely the base, the housing 6 and the flexible foam 8, with the thickness which would be desirable to fully fulfil their function.

Because of this, the portable cassettes 1 according to the state of the art represented in FIG. 1 do not prove to be as robust as desired.

SUMMARY OF THE INVENTION

The invention aims to mitigate all or some of the problems cited above by proposing an innovative portable radiological cassette structure that makes it possible to reinforce the rigidity thereof, ensure a better resistance to deformation and more effectively protect the fragile elements contained in the portable radiological cassette.

To that end, the subject of the invention is a portable radiological cassette comprising:

- a scintillator capable of converting an incident x-ray into a light signal,
- a photosensitive slab capable of converting the light signal emitted by the scintillator into an electrical charge, the scintillator and the photosensitive slab forming a panel, the panel having a front face intended to receive the incident x-ray and a rear face opposite the front face,
- an electronic circuit board ensuring the conversion of the electrical charge into a digital image,
- a mechanical protection housing, in which the panel and the electronic circuit board are disposed, comprising a top face and a bottom face;

characterized in that the top face of the mechanical protection housing comprises:

- a first layer of rigid material,
- a second layer of rigid material, the second layer of rigid material being in contact with the front face of the panel,
- a layer of cellular material disposed between the first and the second layers of rigid material.

According to one aspect of the invention, the layer of cellular material is made of expanded material.

According to one aspect of the invention, the layer of cellular material comprises a stack of at least partially hollow tubes extending substantially at right angles with respect to the front face of the panel.

According to one aspect of the invention, the layer of cellular material comprises a multitude of beads.

According to one aspect of the invention, the beads are hollow.

According to one aspect of the invention, the second layer of rigid material is glued to the front face of the panel.

According to one aspect of the invention, the layer of cellular material is defined by a third thickness and the first and the second layers of rigid material are respectively defined by a first thickness and a second thickness, the first thickness and second thickness being smaller than the third thickness of the layer of cellular material.

According to one aspect of the invention, the layer of cellular material is composed of an organic composite.

According to one aspect of the invention, the first and/or the second layer of rigid material is composed of aluminium and/or of magnesium and/or of carbon or mineral organic fibre composite.

According to one aspect of the invention, the portable radiological cassette comprises an anti-backscatter protection layer disposed against the rear face of the panel, the anti-backscatter protection layer being preferably composed of at least one material of high atomic mass.

According to one aspect of the invention, the portable radiological cassette comprises a thermal insulation layer, the thermal insulation layer being positioned between the electronic circuit board and the rear face of the panel.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the various figures.

DETAILED DESCRIPTION

Figure 2:
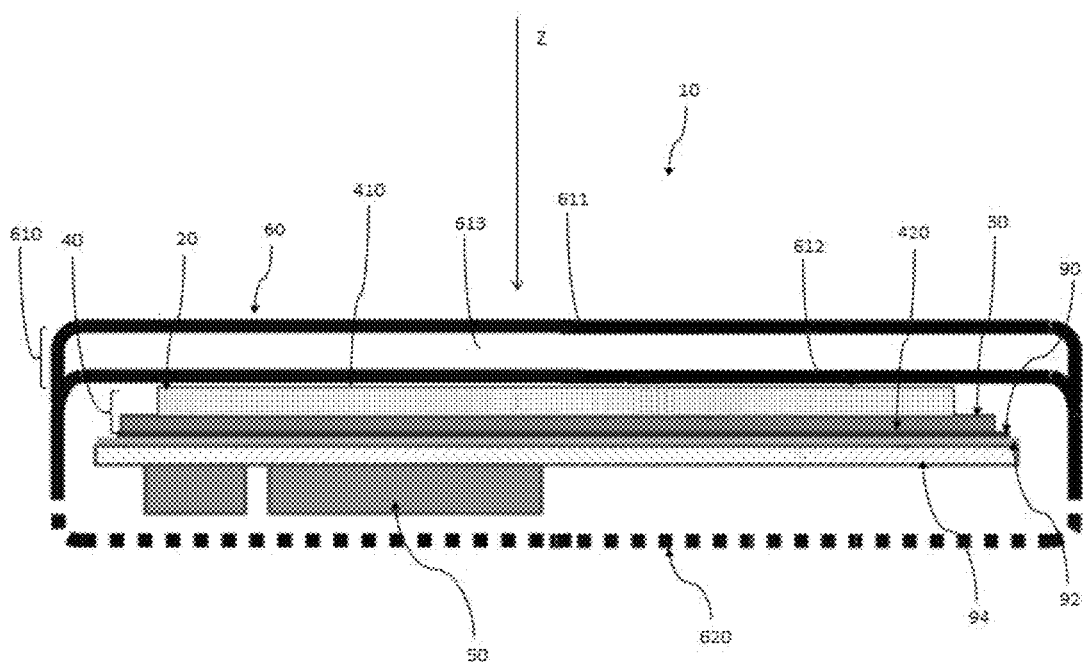
FIG. 2 schematically represents a portable digital cassette structure according to the invention.

FIG. 2 schematically represents a portable digital cassette 10 according to the invention. The portable radiological cassette 10 comprises:

- a scintillator 20 capable of converting an incident x-ray into a light signal,
- a photosensitive slab 30 capable of converting the light signal emitted by the scintillator 20 into an electrical charge. The photosensitive slab 30 is, as an indicative example, a matrix of photosensitive elements. The scintillator 20 and the photosensitive slab 30 form a panel 40 having a front face 410 intended to receive the incident x-ray and a rear face 420 opposite the front face 410,
- an electronic circuit board 50 ensuring the conversion of the electrical charge into a digital image,
- a mechanical protection housing 60, in which the panel 40 and the electronic circuit board 50 are disposed, comprising a top face 610 and a bottom face 620.

The top face 610 of the mechanical protection housing 60 comprises:

- a first layer 611 of rigid material, composed of aluminium and/or of magnesium and/or of carbon or mineral organic fibre composite;
- a second layer 612 of rigid material. The second layer 612 of rigid material is in direct contact with the front face 410 of the panel 40. More specifically, the scintillator 20 of the panel 40 rests against the second layer 612 of rigid material. Thus, the second layer 612 of rigid material ensures the role of rigid structure and therefore allows the panel 40, which is a fragile element, to be rigidly held. Without this contact, a simple twisting of the panel could result in a degradation of the panel 40, which is not desirable. Preferentially, the second layer 612 is obtained from the same rigid material as the first layer 611 that can be composed of a material that is different from the first layer 611;
- a layer of cellular material 613 disposed between the first and the second layers of rigid material 611 and 612. The layer of cellular material 613 can be made of expanded material.

This structure of stacking of the first layer 611 of the layer of cellular material 613 and of the second layer 612 of rigid material can be likened to a so-called "sandwich" structure. The layer of cellular material 613 is thus in contact with the first layer of rigid material 611 and with the second layer of rigid material 612 so as to completely fill a space in the mechanical protection housing 60 between the first layer of rigid material 611 and the second layer of rigid material 612. This successive stacking offers the advantage of ensuring the overall rigidity, against impacts but also twisting, of the assembly while minimizing the absorption of the x-rays. As a variant, the layer of cellular material 613 can be secured to the first layer of rigid material 611 and to the second layer of rigid material 612. As an indicative example, this securing can be done by gluing.

By virtue of this new structure, the base formed in the portable radiological cassette according to the state of the art can be eliminated, allowing the new portable radiological cassette to obtain a weight saving.

Advantageously, the first layer 611 and the second layer 612 of rigid material weakly absorb the x-rays just like the layer of cellular material 613, thus ensuring the good reception of the x-rays for the scintillator 20 of the panel 40. Furthermore, the second layer 612 of rigid material can be glued to the front face 410 of the panel 40 in order to perfectly fix the panel 40 against the second layer 612 and ensure the good rigidity of the panel 40. Thus, any type of permanent gluing allowing the panel 40 to be glued to the second layer 612 of rigid material can be used, such as, for example, a double-sided adhesive, a ductile glue that can dry or any other weak chemical bond, called Van der Waals bond.

Furthermore, the portable radiological cassette 10 according to the invention can comprise an anti-backscatter protection layer 90 disposed against the rear face 420 of the panel 40. Ideally, the anti-backscatter protection layer 90 is in direct contact with the rear face 420 of the panel 40. The anti-backscatter protection layer 90 is preferentially composed of one, or at least one, material of high atomic mass or a combination of materials whose atomic numbers are shrewdly chosen and is intended to limit the backscattering of x-rays towards the panel 40 in a direction substantially opposite the direction of incidence Z of the x-rays that can potentially damage the correct operation of the panel 40 and therefore the portable radiological cassette 10. The portable radiological cassette 10 can also comprise an electromagnetic shielding plate 92 disposed on the other side of the anti-backscatter protection layer 90 and against the anti-backscatter protection layer 90 in order to insulate the panel 40 from any electromagnetic waves generated by the electronic circuit board 50.

The portable radiological cassette 10 can comprise a thermal insulation layer 94, the thermal insulation layer 94 is positioned between the electronic circuit board 50 and the rear face 420 of the panel 40 in order to insulate the panel from the heat generated by the electronic circuit board 50.

Finally, the portable radiological cassette 10 can comprise an energy source (not represented) of the electronic circuit board 50.

Figure 3:
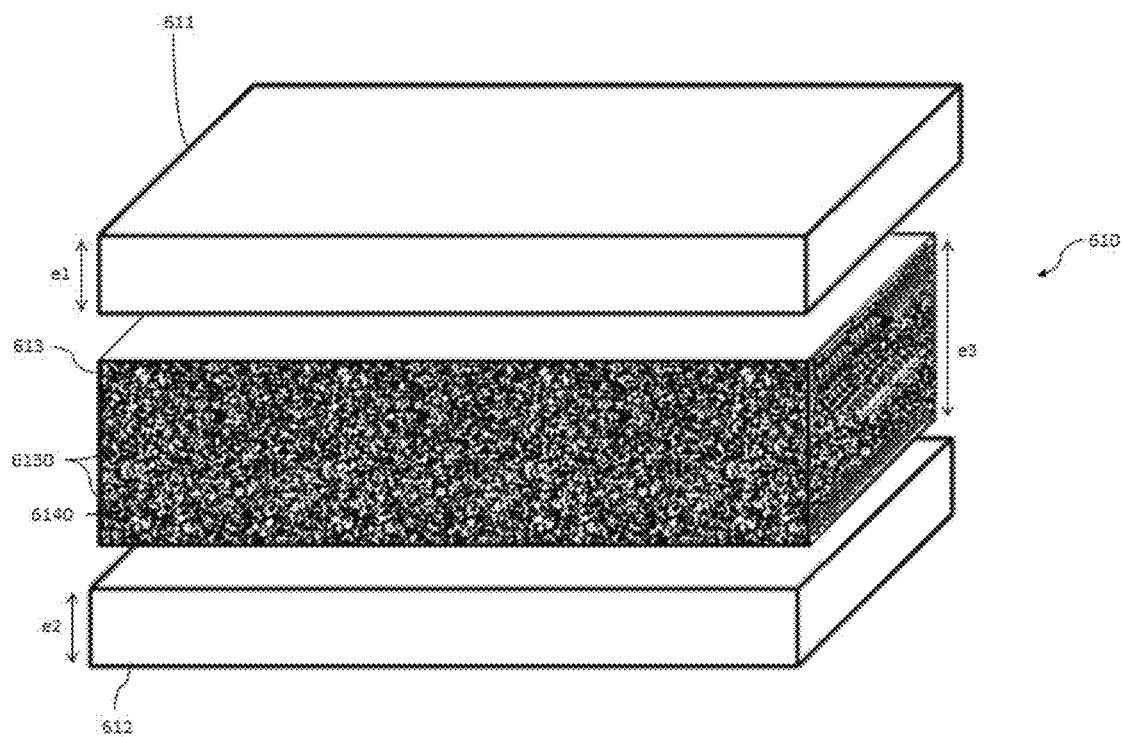
FIG. 3 schematically represents an exploded view of a top face of a housing of the portable digital cassette according to the invention.

FIG. 3 represents an exploded view of the top face 610 of the housing 60 of the portable digital cassette 10. As stated previously, the top face 610 of the housing 60 of the portable digital cassette 10 is defined by the successive stacking of the first layer 611, of the layer of cellular material 613 and of the second layer 612 of rigid material.

Thus, the first layer 611 is defined by a first thickness e1, the second layer 612 of rigid material is defined by a second thickness e2 and the layer of cellular material 613 is defined by a third thickness e3. According to one aspect of the invention, the first thickness e1 and the second thickness e2 are identical. Thus, and by way of example, the first thickness e1 and the second thickness e2 can be between a minimum thickness of approximately 0.2 millimetres and a maximum thickness of 0.7 millimetres. Nevertheless, a dissymmetrical structure can also be envisaged. Thus, the first thickness e1 of the first layer 611 can be different from the second thickness e2 of the second layer 612. As an example, the first thickness e1 can be between 0.3 millimetres and 1.5 millimetres and the second thickness e2 can be between 0.3 millimetres and 1 millimetre. Preferentially, in the case of a dissymmetrical structure between the first thickness e1 and the second thickness e2, the first thickness e1 is greater than the second thickness e2. In fact, for the first layer 611, that can be compared to the outer skin of the housing 60, increasing its thickness, that is to say increasing the thickness e1, makes it possible to increase the thickness of the outer skin of the housing 60 and therefore makes it possible to increase the resistance of the housing 60 to impacts and deformations originating from the outside environment.

The third thickness e3 of the layer of cellular material 613 is very much greater than the first thickness e1 and than the second thickness e2. More specifically, the third thickness e3 can for example be between 2 millimetres and 4 millimetres. Thus, it is possible to establish a size ratio between the third thickness e3 and the sum of the first thickness e1 and of the second thickness e2, and this size ratio can vary between 2 and 8 depending on the sizes of the first, second and third thicknesses e1, e2 and e3.

Thus, this small dimensioning of the first thickness e1 and of the second thickness e2, very much less than the third thickness of the layer of cellular material, added to the fact that the layer of cellular material 613 is largely non-absorbent with respect to the x-rays, does not degrade the quality of the image produced.

In fact, the layer of cellular material 613 is composed of an organic composite which absorbs little or no x-rays. More specifically, the layer of cellular material 613 comprises, in a first embodiment, a multitude of beads 6130. These semi-rigid beads 6130 entirely fill the third thickness e3. Furthermore, with the beads 6130 having a round or oval form and the layer of cellular material 613 having a parallelepipedal form, empty spaces 6140 between the beads 6130 appear uniformly. Thus, in the event of an impact or a load inducing the deformation of the layer of cellular material 613, the beads 6130 are compressed against one another, thus diminishing the empty spaces 6140. Furthermore, since the beads 6130 are semi-rigid, they can also be deformed in the case of an extreme impact or load applied to the layer of cellular material 613.

In this way, the layer of cellular material 613 remains a rigid layer and not a malleable foam retaining the ability to be perfectly deformable in order to take the deformation linked to an impact or to a load instead of the panel 40.

In addition and in order to increase the ability of the beads 6130 to be deformed, the beads 6130 can be hollow beads.

Figure 4:
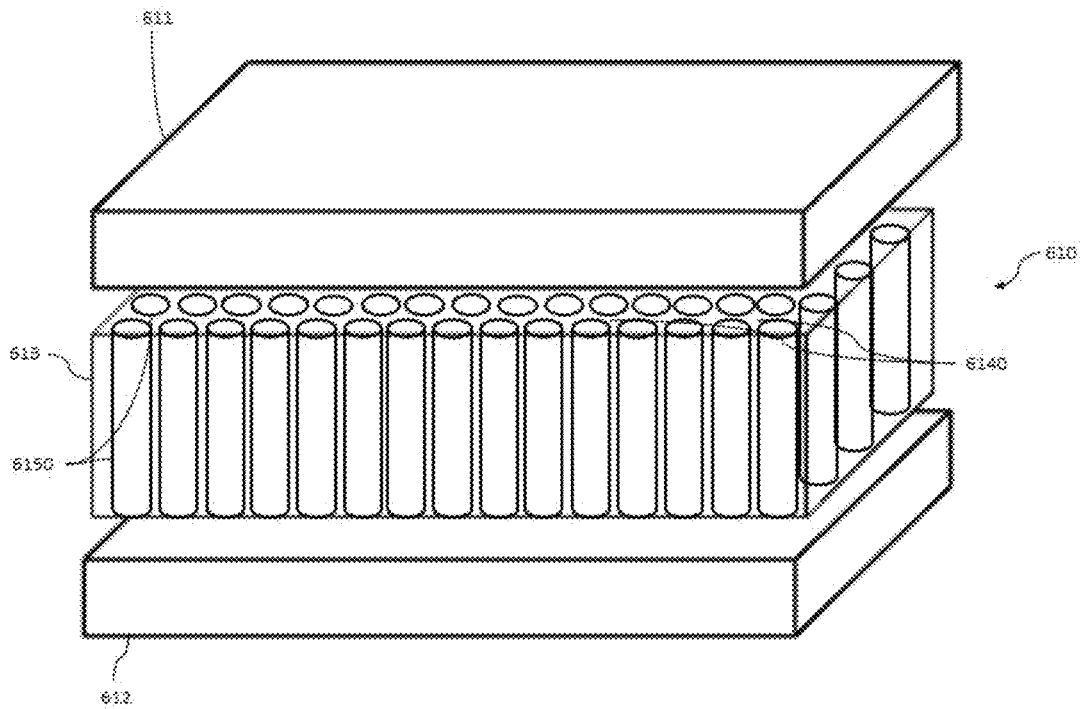
FIG. 4 schematically represents an exploded view of a top face of a housing of the portable digital cassette according to a variant of the invention.

Nevertheless, in a second embodiment, the layer of cellular material 613 can comprise, in place of the beads 6130, a stacking of at least partially hollow tubes 6150 extending substantially at right angles with respect to the front face 411 of the panel 40, as represented in FIG. 4. Like an internal bamboo structure, the tubes 6150 are compartmented by nodes, such that they can be considered as a set of tubings separated by diaphragms. The tubes 6150, stacked thus in the layer of cellular material 613, are in direct contact against one another.

The tubes 6150 can be of oval, square or rectangular section, but are preferentially of hexagonal section. The tubes extend substantially parallel to the direction of incidence Z of the x-rays in the third thickness e3 of the layer of cellular material 613. Thus, there are also empty spaces 6140 between the tubes 6150 allowing the layer of cellular material 613 to be easily deformed. Furthermore, the tubes

6150 can also be deformable, further increasing the ability of the layer of cellular material 613 to be deformed in the event of an impact or load inducing a deformation of the layer of cellular material 613.

Furthermore, in another preferred embodiment, it is possible to envisage using a layer of cellular material 613 comprising a rigid foam defined as a succession of deformable material like a cellular material and of macroscopically uniform cavities, this foam having a matrix macroscopic form like a honeycomb form which then exhibits a macroscopic uniformity. Otherwise, the non-uniform presence of empty spaces in the layer of cellular material 613 can induce shadows on the image produced and therefore degrade the quality of the image produced.

Furthermore, it is also possible to envisage using an expanded structure within the layer of cellular material 613 in order to increase the ability thereof to be deformed.

Figure 1:
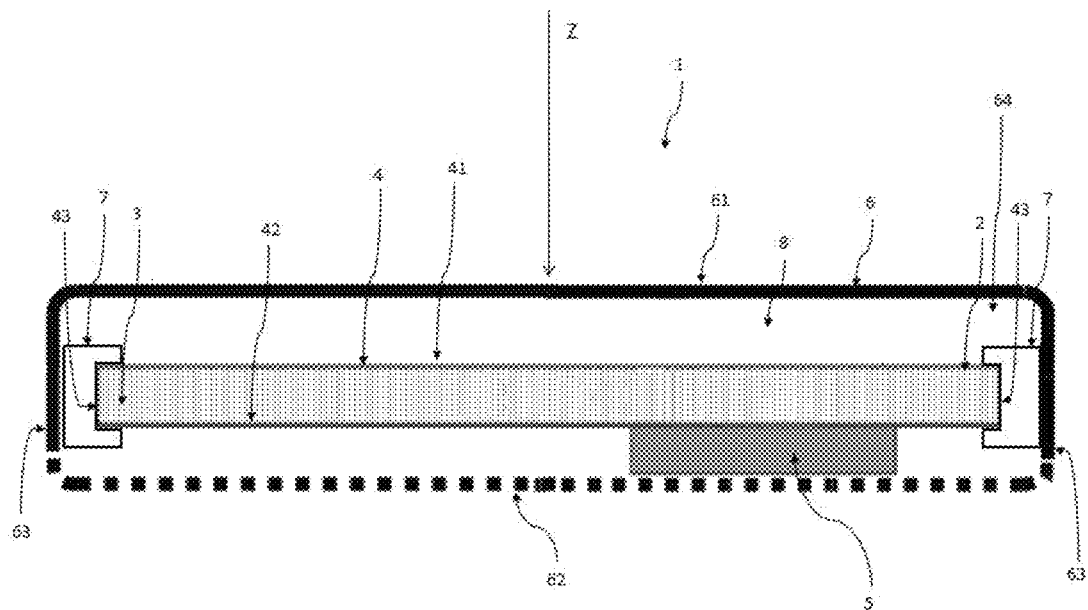
FIG. 1 schematically represents a cross-sectional view of a portable digital cassette structure known from the prior art.

Thus, the top face 610 of the housing 60 of the portable digital cassette 10, which is defined by the successive stacking of the first layer 611, of the layer of cellular material 613 and of the second layer 612 of rigid material, offers a rigidity three to ten times greater than the rigidity of the housing 6, added to the rigidity of the base formed inside the housing 6 according to the state of the art represented in FIG. 1. Furthermore, the deformation of the top face 610 of the housing 60 in the event of it being dropped or bent is reduced in the same proportions. The panel 40, glued to this top face 610 via the second layer 612, is almost non-deformable and thus no longer undergoes deformations likely to damage it. Moreover, this "sandwich" structure of the successive stacking of the first layer 611, of the layer of cellular material 613 and of the second layer 612 of rigid material makes it possible to limit the thickness of the top face 610 to a thickness equivalent to that commonly used in the construction of portable radiological cassettes 1, thus complying with the ISO 4090 standard, and does not degrade the quality of the image produced, the layer of cellular material 613 exhibiting negligible x-ray absorption.

The invention claimed is:

1. A portable radiological cassette comprising:
   a scintillator capable of converting an incident x-ray into a light signal,
   a photosensitive slab capable of converting the light signal emitted by the scintillator into an electrical charge, the scintillator and the photosensitive slab forming a panel, the panel having a front face intended to receive the incident x-ray and a rear face opposite the front face,
   an electronic circuit board ensuring the conversion of the electrical charge into a digital image,
   a mechanical protection housing, wherein the panel and the electronic circuit board are disposed, comprising a top face and a bottom face;
   wherein the top face of the mechanical protection housing comprises:
     a first layer of rigid material,
     a second layer of rigid material, the second layer of rigid material being in contact with the front face of the panel,
     a layer of cellular material disposed between the first and the second layers of rigid material, the layer of cellular material being in contact with the first layer of rigid material and with the second layer of rigid material.

2. The portable radiological cassette according to claim 1, wherein the layer of cellular material is made of expanded material.

3. The portable radiological cassette according to claim 1, wherein the layer of cellular material comprises a stack of at least partially hollow tubes extending substantially at right angles with respect to the front face of the panel.

4. The portable radiological cassette according to claim 1, wherein the layer of cellular material comprises a multitude of beads.

5. The portable radiological cassette according to claim 4, wherein the beads are hollow.

6. The portable radiological cassette according to claim 1, wherein the second layer of rigid material is glued to the front face of the panel.

7. The portable radiological cassette according to claim 1, wherein the layer of cellular material is defined by a third thickness (e3) and the first and the second layers of rigid material are respectively defined by a first thickness and a second thickness (e1, e2), the first thickness and second thickness (e1, e2) being smaller than the third thickness (e3) of the layer of cellular material.

8. The portable radiological cassette according to claim 1, wherein the layer of cellular material is composed of an organic composite.

9. The portable radiological cassette according to claim 1, wherein the first and/or the second layer of rigid material is composed of aluminium and/or of magnesium and/or of carbon or mineral organic fibre composite.

10. The portable radiological cassette according to claim 1, comprising an anti-backscatter protection layer disposed against the rear face of the panel, the anti-backscatter protection layer being preferably composed of at least one material of high atomic mass.

11. The portable radiological cassette according to claim 1, comprising a thermal insulation layer, the thermal insulation layer being positioned between the electronic circuit board and the rear face of the panel.

* * * * *